United States Patent
Dayan et al.

(10) Patent No.: US 8,706,802 B1
(45) Date of Patent: Apr. 22, 2014

(54) LATENCY-GUIDED WEB CONTENT RETRIEVAL, SERVING, AND RENDERING

(75) Inventors: Tal Dayan, Los Gatos, CA (US); Stephane Lafon, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 12/625,352

(22) Filed: Nov. 24, 2009

(51) Int. Cl.
*G06F 15/16* (2006.01)

(52) U.S. Cl.
USPC .......................... 709/203; 715/732; 345/632

(58) Field of Classification Search
USPC ........................................................ 709/203
See application file for complete search history.

(56) References Cited

U.S. PATENT DOCUMENTS

| | | | | |
|---|---|---|---|---|
| 6,012,096 A * | 1/2000 | Link et al. | | 709/233 |
| 6,021,426 A * | 2/2000 | Douglis et al. | | 709/200 |
| 6,182,125 B1 * | 1/2001 | Borella et al. | | 709/218 |
| 6,243,761 B1 * | 6/2001 | Mogul et al. | | 709/246 |
| 6,442,603 B1 * | 8/2002 | Borella | | 709/218 |
| 6,959,318 B1 * | 10/2005 | Tso | | 709/203 |
| 7,006,448 B1 * | 2/2006 | Thio | | 370/252 |
| 7,024,045 B2 * | 4/2006 | McIntyre | | 382/239 |
| 7,114,160 B2 * | 9/2006 | Suryanarayana et al. | | 719/315 |
| 7,296,089 B2 * | 11/2007 | Krishnamurthy et al. | | 709/238 |
| 7,423,649 B2 * | 9/2008 | Henocq et al. | | 345/473 |
| 7,568,201 B2 * | 7/2009 | Suryanarayana et al. | | 719/315 |
| 7,676,570 B2 * | 3/2010 | Levy et al. | | 709/224 |
| 7,747,729 B2 * | 6/2010 | Levy et al. | | 709/224 |
| 7,934,155 B2 * | 4/2011 | Benari et al. | | 715/247 |
| 7,996,495 B2 * | 8/2011 | Dekel et al. | | 709/219 |
| 8,010,702 B2 * | 8/2011 | Farouk | | 709/246 |
| 8,024,483 B1 * | 9/2011 | Rothstein et al. | | 709/247 |
| 2002/0016801 A1 * | 2/2002 | Reiley et al. | | 707/523 |
| 2002/0184238 A1 * | 12/2002 | Chylla | | 707/104.1 |
| 2007/0013708 A1 * | 1/2007 | Barcklay et al. | | 345/557 |
| 2008/0222273 A1 * | 9/2008 | Lakshmanan et al. | | 709/219 |
| 2009/0225076 A1 * | 9/2009 | Vlietinck | | 345/419 |
| 2009/0262133 A1 * | 10/2009 | Opala et al. | | 345/619 |
| 2009/0303251 A1 * | 12/2009 | Balogh et al. | | 345/632 |
| 2010/0115462 A1 * | 5/2010 | Spencer et al. | | 715/800 |
| 2010/0123732 A1 * | 5/2010 | Jenks et al. | | 345/592 |
| 2011/0010629 A1 * | 1/2011 | Castro et al. | | 715/732 |
| 2011/0055470 A1 * | 3/2011 | Portolani | | 711/108 |
| 2011/0125916 A9 * | 5/2011 | Dhuse et al. | | 709/231 |

OTHER PUBLICATIONS

Zhang, "Web Content Adaptation—for Mobile Handheld Devices," Communications of the ACM, Feb. 2007, vol. 50, No. 2, pp. 75-79.

(Continued)

*Primary Examiner* — Hamza Algibhah
(74) *Attorney, Agent, or Firm* — Dority & Manning, P.A.

(57) ABSTRACT

Embodiments of the present invention relate to the retrieval, serving, and rendering of web content provided from a web content server to a requesting client device, e.g., over a network, based on target latency. A computer-implemented method includes determining, by a web content server, a requesting client device in communication with the web content server, or both, latency-related limitations of the client device. The method also includes determining, by the web content server, the client device, or both, web content needs of the client device based on a web content request from the client device. The method further includes adjusting web content to be displayed at the client device based on the determined latency-related limitations and needs of the client device. At least a portion of the adjusting of web content can occur at the web content server, the client device, or both. Related systems are also presented.

30 Claims, 18 Drawing Sheets

(56) References Cited

OTHER PUBLICATIONS

Harumoto et al., "Effective Web Browsing Through Content Delivery Adaptation," ACM Transactions on Internet Technology, Nov. 2005, vol. 5, No. 4, pp. 571-600.

Harumoto et al., "A WWW Server with Media Scaling Mechanism Based on Page Transmission Latency," Proc. IEEE Pacific Rim Conference on Communications, Computers and Signal Processing, 1999, pp. 444-447.

* cited by examiner

1102

AT LEAST ONE OF:

A) DETERMINING A NETWORK LATENCY AND/OR SPEED OF A NETWORK INCLUDING THE TARGET CLIENT DEVICE; AND

B) DETERMINING A RENDERING LATENCY OF THE TARGET CLIENT DEVICE

AT LEAST ONE OF:

A) DETERMINING A LEVEL OF DETAIL OF THE WEB CONTENT;

B) DETERMINING PARTS OF THE WEB CONTENT THAT NEED TO BE PROVIDED TO THE TARGET CLIENT DEVICE; AND

C) DETERMINING AN EXPECTED DISPLAY AREA SIZE OF THE WEB CONTENT TO BE DISPLAYED

AT LEAST ONE OF:

A) DETERMINING PORTIONS OF THE WEB CONTENT THAT ARE NOT ALREADY CACHED AT THE TARGET CLIENT DEVICE;

B) DETERMINING PORTIONS OF THE WEB CONTENT THAT ARE IN THE REQUESTED VIEW OF THE TARGET CLIENT DEVICE; AND

C) DETERMINING PORTIONS OF THE WEB CONTENT THAT ARE MORE USEFUL TO A USER OF THE TARGET CLIENT DEVICE

ONE OR MORE OF:

A) ADJUSTING A NUMBER OF DISPLAY ITEMS TO BE DISPLAYED AT THE TARGET CLIENT DEVICE;

B) ADJUSTING A DISPLAY AREA SIZE FOR DISPLAYING ONE OR MORE DISPLAY ITEMS AT THE TARGET CLIENT DEVICE; AND

C) ADJUSTING A COMPRESSION LEVEL FOR ONE OR MORE DISPLAY ITEMS TO BE DISPLAYED AT THE TARGET CLIENT DEVICE

FIG. 15

LATENCY-GUIDED WEB CONTENT RETRIEVAL, SERVING, AND RENDERING

FIELD OF THE INVENTION

Embodiments of the present invention relate to retrieval, serving, and rendering of web content.

BACKGROUND

When a user opts to view multimedia web content in an interne browser, at least some of that web content may be of high quality (e.g., high quality images, video, audio, etc.) and might be quite large in size. The retrieval, serving, and rendering of such web content will have varying response time differences depending on many factors related to the user's device (i.e., client device), the server device, and the network connecting the two devices. For example, when a user of Google™ Inc.'s Street View application opts to view a Street View image, the client device (e.g., a computing device such as a computer, laptop, handheld device, mobile telephone, etc.) fetches from a server device image tiles needed to render the image for display at the client device. The image tiles stored at the server are high quality images that are very large in size. For fast client devices, there would be little to no response time issues. However, for a client device considered slow (due to various factors such as poor network speed and/or network latency, distance to/from server, rendering latency of the client device, etc.), it could take a considerable amount of time (e.g., minutes) to fetch and render such an image.

Conventional ways of dealing with the variation in client- and network-related latency include targeting web content for an 'average' user or for a 'worst case' user. For example, tile images may be heavily compressed to reduce their respective sizes and improve response time. This may require storing web content at the server at predefined compression levels and sizes that are then served to all users, fast or slow. These techniques do not take into account the various differences in each user's device and connection setup. Thus, this practice penalizes fast client devices as the fine details of an image may be lost.

Systems and methods are needed that optimize the retrieval, serving, and rendering of web content for the many variations of client devices and their network connections.

BRIEF SUMMARY

Embodiments of the present invention relate to the retrieval, serving, and rendering of web content provided from a web content server to a requesting client device, e.g., over a network such as the Internet, based on target latency. In an embodiment, a computer-implemented method includes determining latency-related limitations of the requesting target client device. The determining of latency-related limitations of the target client device can be done by a processor of a web content server, a processor of the target client device, or both. The method also includes determining, by the web content server, the target client device, or both, web content needs of the target client device based on a web content request from the target client device. The method further includes adjusting web content to be displayed at the target client device based on the determination of the latency-related limitations and the web content needs of the target client device. In an embodiment, the method can further include providing the web content to the target client device.

In embodiments, the determining of latency-related limitations can include, for example, determining one or more of a network latency and/or speed of a network including the target client device, and/or a rendering latency of the target client device. The determining of web content needs of the target client device includes determining a level of detail of the web content requested by the target client device, parts of the web content that need to be provided to the target client device, and an expected display area size of the web content to be displayed. In an embodiment, at least a portion of the adjusting of web content occurs at the web content server. In another embodiment, at least a portion of the adjusting of web content occurs at the target client device. The adjusting of web content can include, for example, adjusting one or more of a number of display items to be displayed at the target client device, a display area size for displaying one or more display items at the target client device, and a compression level for one or more display items to be displayed at the target client device.

According to an embodiment, a computer-based system for receiving web content from a server based on target latency includes a client device including at least one processor and display capability, with the client device in communication with a web content server. The system also includes a latency analyzer embodied at least in part in the client device. Upon a request for web content from the client device to the web content server, the latency analyzer determines latency-related limitations of the client device and web content needs of the client device such that the web content to be displayed at the client device can be adjusted to optimize web content display response time at the client device. In an embodiment, the system can also include a web content adjuster embodied at least in part in the client device that adjusts the web content to be displayed at the client device based on the latency-related limitations and web content needs.

According to another embodiment, a web content server that provides web content to a requesting client device includes one or more processors that retrieve and serve web content to a requesting client device in communication with the web content server. The web content server also includes a latency analyzer embodied at least in part in the one or more processors. Upon receiving a request for web content from the client device, the latency analyzer determines latency-related limitations of the client device and web content needs of the client device such that the web content to be displayed at the client device can be adjusted to optimize web content display response time at the client device. In an embodiment, the web content server can also include a web content adjuster embodied at least in part in the one or more processors that adjusts the web content to be displayed at the client device based on the latency-related limitations and web content needs.

In a still further embodiment, a tangible computer program product includes a computer readable medium having computer program logic recorded thereon for causing at least one processor of a web content server and/or a client device requesting web content from the web content server to determine latency-related limitations of the client device and determine web content needs of the client device. The computer program logic can further cause at least one processor of a web content server and/or a client device to adjust the web content to be displayed at the client device based on the latency-related limitations and web content needs of the client device such that web content display response time at the client device is optimized.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and to use the invention.

FIG. 12 depicts further detail of step 1102 of the method depicted in FIG. 11, according to an embodiment of the present invention.

FIG. 13 depicts further detail of step 1104 of FIG. 11, according to an embodiment of the present invention.

FIG. 14 depicts further detail of step 1104(B) of FIG. 13, according to an embodiment of the present invention.

FIG. 15 depicts further detail of step 1106 of the method depicted in FIG. 11, according to an embodiment of the present invention.

The present invention is described with reference to the accompanying drawings. The drawing in which an element first appears is typically indicated by the leftmost digit or digits in the corresponding reference number.

DETAILED DESCRIPTION OF EMBODIMENTS

Overview

Embodiments of the present invention relate to the retrieval, serving, and rendering of web content provided from a web content server to a requesting client device (e.g., over a network such as the Internet) based on target (client-related) latency. Target latency can include any latency or delay related to one or more of characteristics of a requesting client device, its connection to the internet, its internet service provider, network characteristics or conditions, etc. An analysis of a target's latency can provide information useful for optimizing retrieval, serving, and rendering of web content on an individual target client basis. This optimization can provide a user viewing web content at a client device with improved response time, and therefore a more enjoyable web experience.

This Detailed Description is divided into sections. The first section provides a description of an environment for which embodiments of the present invention are suited. The second section provides a discussion of response time analysis, and in particular, information that can be used for such analysis. The third section provides a description of response time optimization adjustments that can be made. The fourth section describes a system architecture that can be used to implement embodiments of the present invention. The fifth section provides a discussion of methods related to embodiments of the present invention. Finally, the sixth section describes an exemplary computer system that can be used to implement embodiments of the present invention, followed by a Conclusion section.

Environment

Figure 1:
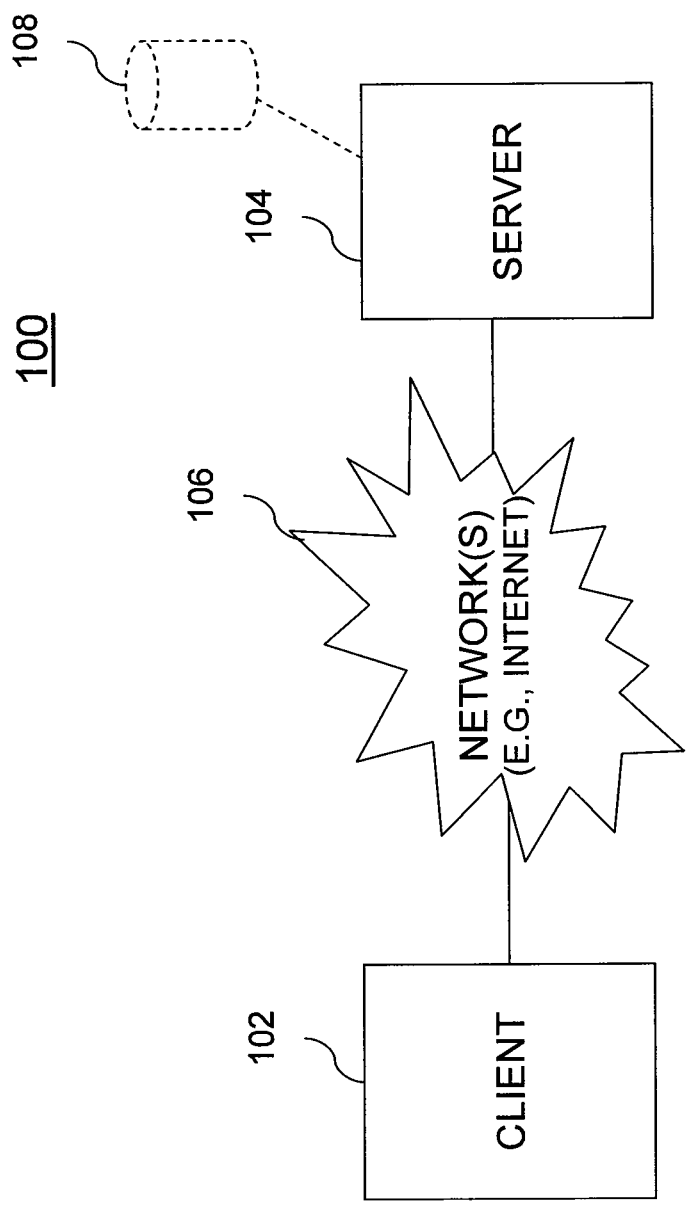
FIG. 1 illustrates an exemplary client/server network environment with a client device in communication with a server device over a communication network.

FIG. 1 illustrates an exemplary client/server network environment 100 including a client device 102 in communication with a server device 104 (e.g., a web content server) over one or more communication networks 106. Network(s) 106 can include one or more networks or a combination of networks extending over small to large areas including, but not limited to, the Internet. Server 104 can be coupled to a database 108 that contains, for example, web content such as text and images. Database 108 can be external to server 104 (as shown, for example) or can be located within server 104.

Figure 2:
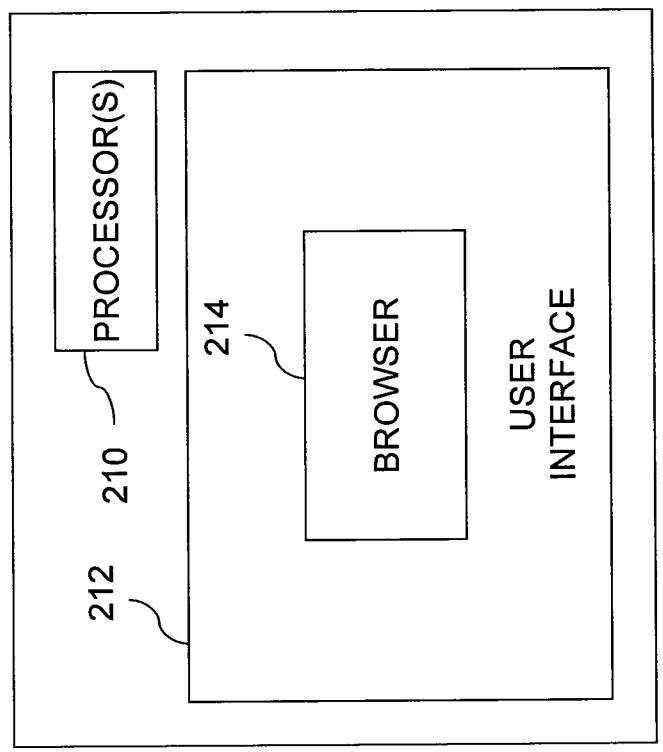
FIG. 2 illustrates an exemplary client device including one or more processors and a user interface.

FIG. 2 illustrates an exemplary client device 102 including one or more processors 210 and a user interface 212. Client 102 can be, for example, a personal computer, a laptop computer, a personal handheld device, a mobile telephone, a game console, a set-top box, an embedded system, etc., but is not to be limited to these devices. Client 102 can include any computing device that can request web content from a web content server such as server 104.

Client 102 includes a user interface 212 that can include various types of inputs and outputs that allow a user to interact with client 102. Example inputs can include, but are not limited to, a mouse, a keyboard, a keypad, a touchscreen, a microphone, etc. Example outputs can include, but are not limited to, a display for visual output, a speaker for audible output, etc. Many, if not all, of the above interface examples are driven, supported, or enhanced by hardware, firmware, and/or software located or running within client 102. For the viewing of web content, for example, user interface 212 can include a web browser 214. Browser 214 includes software running on client 212 that allows a user to request and view web content (i.e., content that can be provided from a server, such as server 104, connected to client 102 via one or more networks (e.g., the Internet or World Wide Web). Examples of browsers 214 include, but are not limited to, Chrome by Google™ Inc., Internet Explorer® by Microsoft®, Firefox® by Mozilla® Corporation, Safari® by Apple® Inc., Opera® by Opera Software™ ASA, etc.

Figure 3:
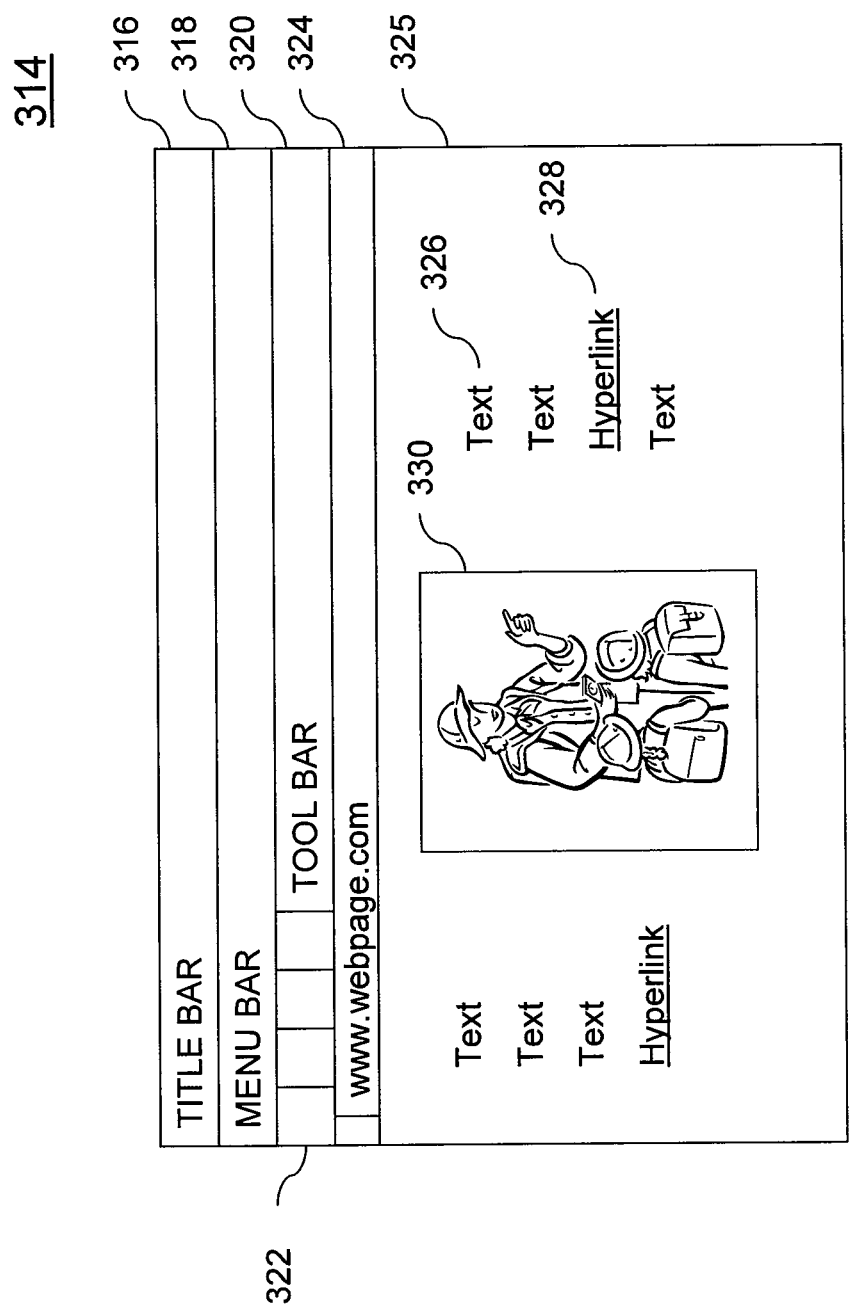
FIG. 3 illustrates exemplary web content displayed in a browser window in a user interface of a client device.

FIG. 3 illustrates an exemplary browser window 314 as displayed to a user of a client device 102. A typical browser window 314 can include a title bar 316, a menu bar 318, a tool bar 320, a URL (Uniform Resource Locator) field 324, and a body 325. Title bar 316 can contain the title that the designer of the web page named the web page being viewed. Menu bar 318 can contain various drop-down menus that include tools and options related to the web page being viewed. Tool bar 320 can contain various buttons 322 representative of tools and options related to the presently viewed web page and/or navigation to other web pages. URL field 324 can contain the address of the web page being viewed and may allow a user to type in an address of another web page to be viewed. Body 325 can contain the content of the web page, including, for example, text 326 and images 330. Text in body 325 can also be representative of a hyperlink 328 that is typically highlighted and/or underlined to be distinguishable from general text. If a user selects, or clicks on, a hyperlink 328, a new web page can appear, for example in place of, or in addition to, the currently viewed web page that relates to the text shown in hyperlink 328.

When a user opts to view a web page, for example by entering an address in the URL field in a browser window such as browser window 314, clicking on a hyperlink (in a currently viewed web page, an email, an electronic document, etc.), or using the menu bar 318 or tool bar 320, or opts to view specific web content on a web page (e.g., a new view of an image), a request for the corresponding web content is sent over one or more networks 106 to the appropriate web content server 104. Server 104 retrieves or fetches the requested web content, from database 108 for example, and serves it (sends it) to the requesting client device 102. Client device 102 receives the requested web content and renders it for display in, for example, browser window 314.

The time it takes from the initial user request for web content to the display of the web content in a browser window can vary greatly among client devices 102 depending on many factors. For example, a client device 102 may include very slow or very inefficient processors, or may include very little memory compared to other client devices, which could cause the response time to be longer than it otherwise could be. The network connection of the client device can also be a factor. For example, a dial-up connection may be slow as compared to a Digital Subscriber Line (DSL) connection or a cable connection, and any of these may be slower than a dedicated T-1 connection. There may also be a difference in response time if client device 102 is connected wirelessly to its network line. In addition, the internet service provider (ISP) used by the client may also be a factor in response time. Still further, the speed and/or latency of the network(s) 106 may also be factors that contribute to response time, as well as simply the distance between the client device and the server device. Thus, response times for receiving or displaying requested web content can vary greatly depending on the network and device characteristics of a client device 102. Therefore, optimization of the response time on an individual client device basis is needed.

Response Time Analysis

The differences in web content response times based on a client device's individual device and network characteristics lend themselves to catering response time improvement on an individual basis. Analyzing these individual characteristics when a web content request is made (by a client), and/or received (by a server), can greatly improve the serving of web content to all variations of clients.

The information that would be useful for this analysis can include, for example, information regarding what type of device the client device is, along with its device- and network-related characteristics and/or statistics. For example, a small personal handheld device or a mobile telephone can have different characteristics than a personal computer or laptop. Available memory and processing speed of these devices may be contributing factors in determining rendering latency or network latency, for example. In addition, the display area size for each of these devices may also be a factor with regard to what can be displayed and to what level of detail. Network-related characteristics and information for a particular device can include, for example, information regarding the network connection the device is using (e.g., dial-up, cable, dedicated T-1, wireless router usage, etc.) and/or the internet service provider of the client device (the cable company, the telephone company, Earthlink®, RoadRunner High Speed Online™, NetZero®, etc.). In embodiments, the device- and network-related characteristics and/or statistics can be collected, for example, in user sessions of the client device and/or based on an IP address of the client device.

In order to determine a network latency, or network speed, with regard to a client device, it may be useful to perform a test. For example, in an embodiment, the network latency or speed can be determined by measuring a length of time it takes for a web content item to be requested by the client device, fetched by the web content server, and delivered to the client device. The rendering and display of the web content at the client device can also be included in this measurement. In an embodiment, a similar measurement can be made by measuring a round-trip time delay of a ping from the web content server to the client device, or alternatively (or additionally), a ping from the client device to the web content server.

Aside from, or in addition to, determining a network latency of the client device or a rendering latency of the client device, other information that would be useful in determining response time optimization for a particular client includes information related to the requested web content itself and the specific needs of the client device in relation to the requested web content. For example, in an embodiment, a sufficient level of detail of the web content that is needed to fulfill the client request can be determined. As another example, in embodiments, parts of the web content that would need to be provided to the client device can be determined. For instance, portions of requested web content that may already be cached at the client device would not need to be provided to the client device. Also, as another example, functionality that is considered less useful to a user (i.e., unnecessary, of a lower priority, not highly used, etc.) can be removed from (i.e., not included in) the web content to be provided or displayed. As an additional example, the web content limitations based on the expected display area size of the client device need to be considered.

A further example of determining parts of the web content that would be need to be provided to the client device includes, in an embodiment, determining portions of the web content that are in a requested view of the user at the client device. This is applicable, for example, for a user viewing a panoramic image, an image in zoom mode, or any image in which the view window displays only a portion of the image and allows the user to navigate to other views of the image not currently, or only partially, within the current view window. One example application that has this feature is Google™ Inc.'s Street View application. When a user is viewing an image (e.g., of a location in Street View) and wants to look toward the right, the user can use an appropriate user interface mechanism (e.g., a mouse, an arrow, etc.) to scroll, or pan, in the direction of the desired view. When doing so, the view window can stay the same size, but the view within the window changes depending on the direction of panning. An example of this is shown in FIGS. 4-6.

Figure 4:
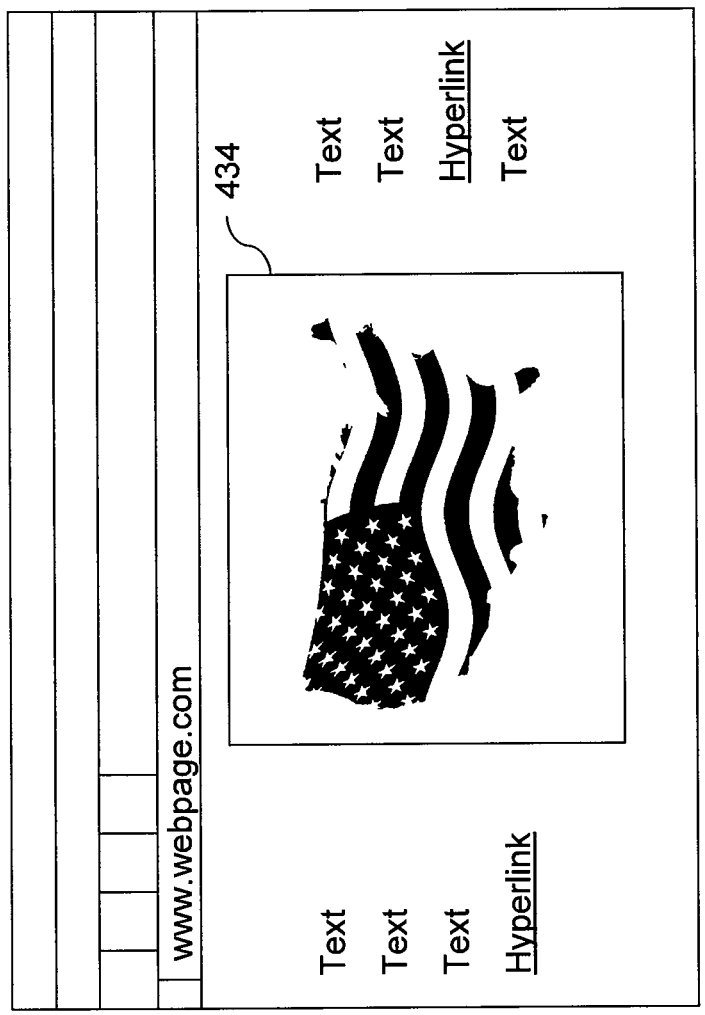
FIGS. 4 and 5 illustrate an exemplary image displayed in a browser window in a user interface of a client device.

FIG. 4 illustrates an image 434 that is part of a web page 414. The image is of a likeness of the United States flag in the shape of the United States, and is being used as a simplified example of a map-like image. As shown in FIG. 5, image 434 can be made up of a plurality of image tiles 536. In this example, image 434 is not an entire image, but instead is a zoom level of an image. In other words, image 434 is a zoomed-in portion of a larger image, meaning there is more to image 434 than is shown within its current view window.

Typically, the more zoomed-in the view, the higher the resolution of the tiles. Conversely, the more zoomed-out the view, the lower the resolution of the tiles. Navigating within an image (e.g., by panning) changes the collection of image tiles that are necessary for displaying the image. For example, if a user pans to the right, then the image tiles neighboring the right-most image tiles in the current image view window need to be displayed, while the left-most image tiles in the current image view window can be removed. FIG. 6 illustrates an example of this. In FIG. 6, a user viewing image 434 pans to the right, as shown by arrow 640. An appropriate number of columns 642 (in this example, two columns) of image tiles are then added to the view window, and the same number of image tiles that were on the left side of the view window are removed. In this example, panning to the right reveals a boat in image 434 that could not be seen in the previous view. Zooming in or out has a similar effect in that the image tiles (and possibly also their resolution) required for the view changes.

Figure 5:
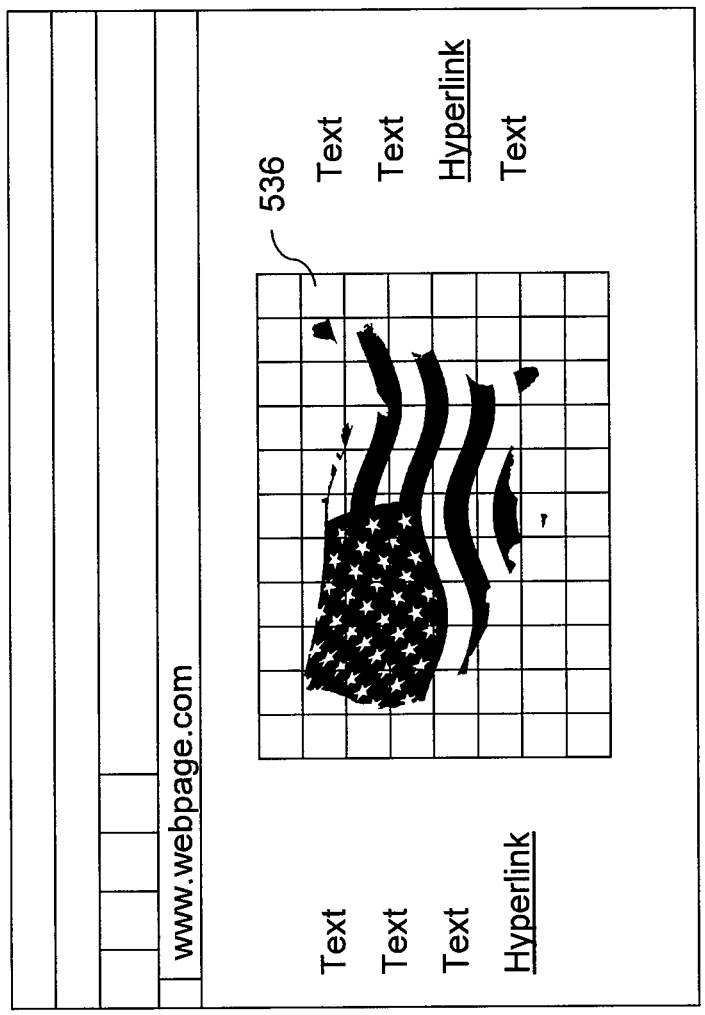
Figure 6:
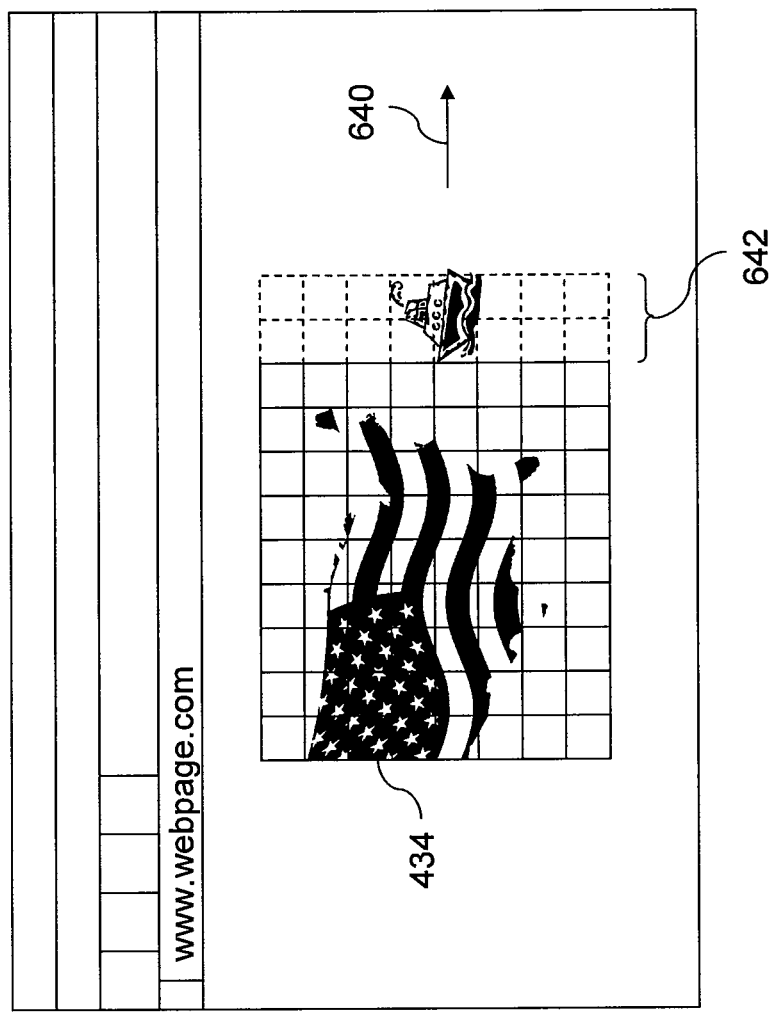
FIGS. 6-9 illustrate various web content display adjustments, according to embodiments of the present invention.

The purpose of the example shown in FIGS. 4-6 is to demonstrate that if a requested view (e.g., a pan or a zoom) of an image is determined, then only the necessary image tiles for that view need to be provided, as opposed to all tiles applicable for displaying that image in its entirety. In embodiments, other geographical information and/or images (including, but not limited to, satellite, map, and panoramic images and information) can be used or displayed. Examples discussed above are demonstrated using an image. However, one of ordinary skill in the art would appreciate that the above-described features may be applicable to other types of web content as well (e.g., a web page layout, video, etc.).

In embodiments of the present invention, any, all, or a combination of the information discussed above can be obtained and analyzed by the web server, the client device, or both, to determine latency-related limitations of the client device and web content needs of the client device, and to ultimately determine one or more adjustments to be made to the requested web content to optimize response time, as is further discussed below. The invention is not to be limited to the types of information exemplified above. It is to be appreciated that other types of information obtained for analysis are also contemplated as being within the scope of the present invention.

Response Time Optimization Adjustments

Once any, all, or a combination of the information discussed above is obtained and analyzed, adjustments can be made to the web content to optimize response time based on the analyzed information. These adjustments can be made by the web content server, the client, or a combination of both, depending on the adjustment to be made. In embodiments, examples of adjustments that can be made to improve response time at a requesting client device can include, for example: adjusting a display area size for displaying one or more display items at the client device, adjusting a number of display items to be displayed at the client device, and/or adjusting a compression level for one or more display items to be displayed at the client device.

Figure 7:
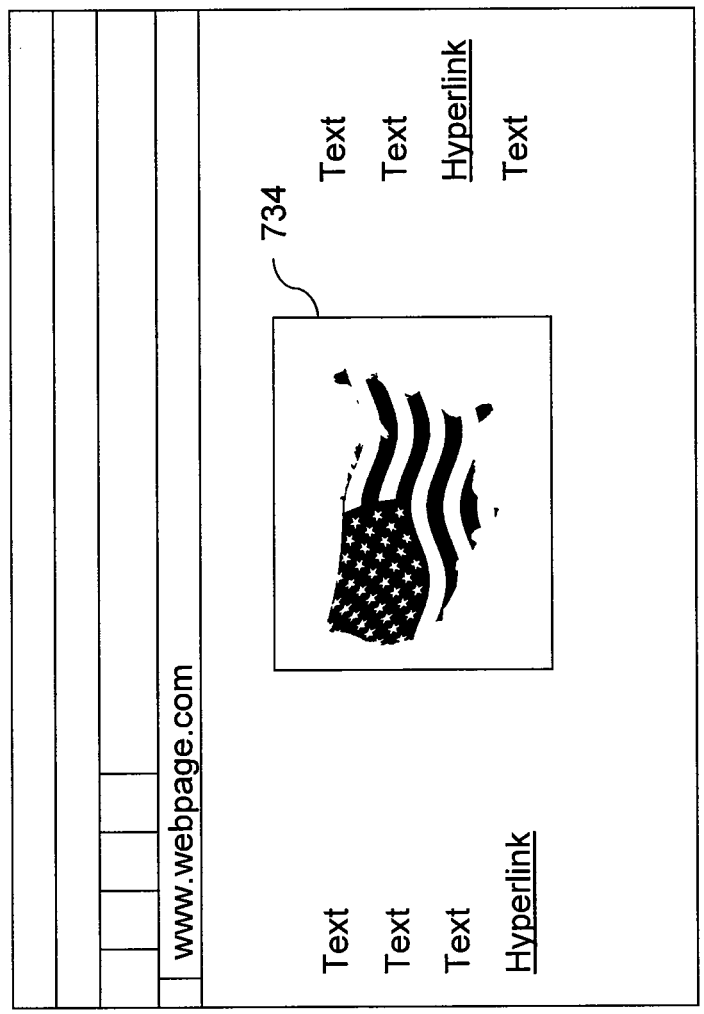

In an embodiment, a display area size for displaying one or more display items can be adjusted. For example, as shown in FIG. 7, image 734 can be displayed in a smaller view window. As shown in FIG. 7, the view window for image 734 is considerably smaller than for image 434 in FIG. 4. This can improve response time at the client device because, for example, the image tiles can be provided at a lower resolution (and therefore would be smaller in size) than would be the case if the view window were larger. The adjustments that may be involved in this embodiment can be made, or directed, by the web content server, the client device, or a combination of both. For example, the web content server can provide image tiles at a lower resolution, and the client device can, in turn, display the image in a smaller view window.

Figure 8:
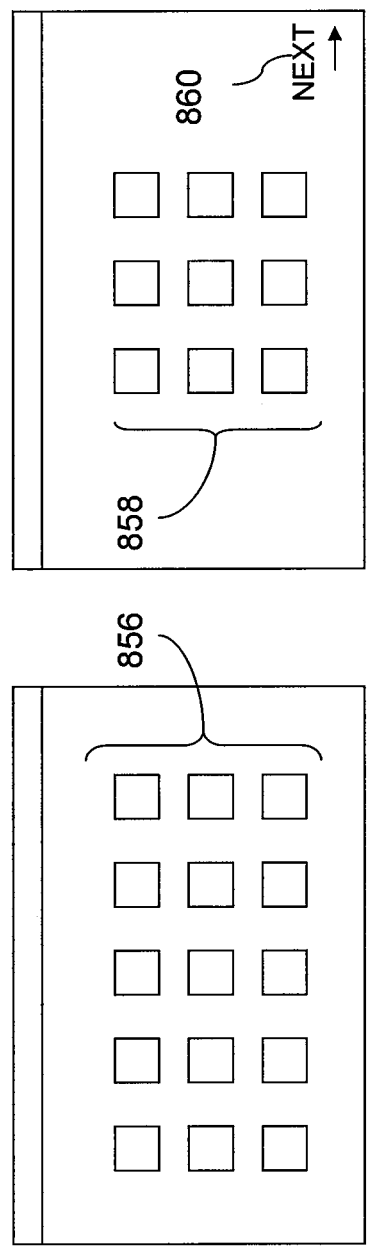

In an embodiment, a number of display items to be displayed at the client device can be adjusted, as shown in FIGS. 8A and 8B. For example, for a faster client device configuration, more display items (e.g., images, thumbnails, etc.) can be displayed at a time, as shown in FIG. 8A where fifteen display items 856 are shown. For a slower client device configuration, response time can be improved if less display items are shown at a time, as shown in FIG. 8B where only nine display items 858 are shown. In an embodiment, the user can be provided with a way to display remaining display items. For example, the user may be given a hyperlink 860 that can be selected to view a "next" page of display items. The adjustments that may be involved in this embodiment can be made, or directed, by the web content server, the client device, or a combination of both. For example, the web content server could provide a smaller number of display items to the client for display, or in the alternative, the web content server could send a number of the display items and the client device could display only a subset of those at a time.

In an embodiment, a compression level for one or more display items to be displayed at the client device can be adjusted. For example, the compression level for one or more images to be displayed can be adjusted. Compression of an image at a lower compression level typically means a higher resolution image as compared to compression of the image at a higher compression level. Using a higher compression level can improve response time at the client device due to smaller image files or image tiles being provided and displayed at a lower resolution. As stated previously, it may be beneficial to use a higher compression level for an image (providing the image at a lower resolution), and display it in a smaller view window. The adjustments that may be involved in this embodiment can be directed by the web content server, the client device, or a combination of both. However, compression at the adjusted compression level would be done by the web content server.

Figure 9:
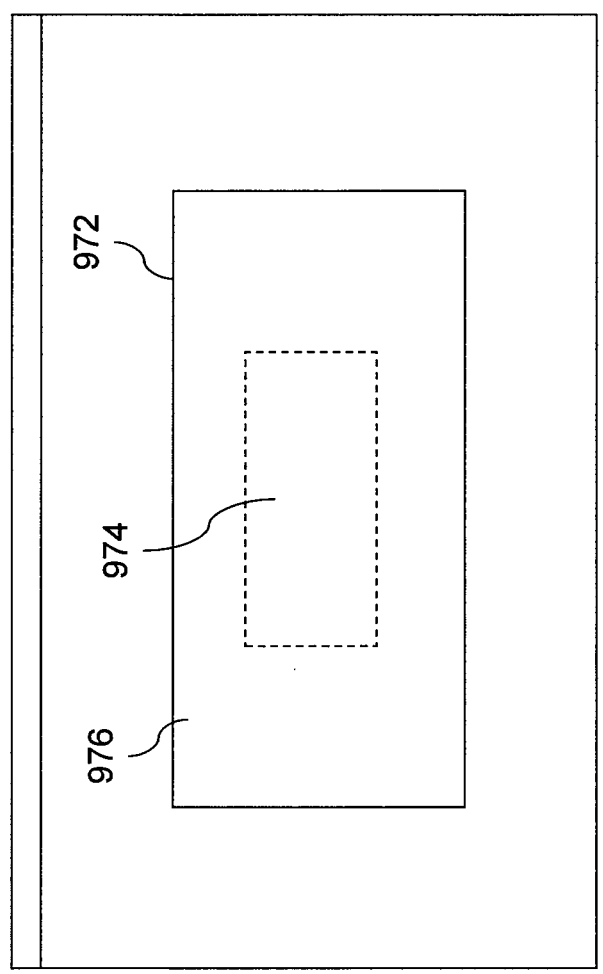

In another embodiment, adjusting the compression level for one or more images can include adjusting the compression level to compress image tiles in an approximate center of an image at a lower compression level and to compress image tiles near a border of the image at a higher compression level. An example of this is shown in FIG. 9, where in an image 972, image tiles that make up the area 974 of the image delineated by a dotted line can be compressed at a lower compression level (and have a higher resolution) than image tiles that make up the area 976 that surrounds area 974. The thought behind this adjustment is that a user is typically more interested in what is in the center of an image than on the borders of an image. The adjustments that may be involved in this embodiment can be directed by the web content server, the client device, or a combination of both. However, compression at the adjusted compression levels would be done by the web content server.

In yet a further embodiment, response time at the client can be improved or optimized by having the web content server provide low-detail web content to the client device and incrementally provide higher-detail web content to the client device based on the determination of latency-related limitations of the client device. This can be done by using an incremental encoding technique, such as wavelet encoding.

The invention is not to be limited to the types of adjustments exemplified above. It is to be appreciated that other types of adjustments are also contemplated as being within the scope of the present invention.

System Architecture

In embodiments of the present invention, the determination of latency-related limitations and web content needs of a client device requesting web content from a web content server, and the adjustments to the web content that are made based on those determinations, can be handled by the web content server, the client device, or a combination of the two devices, as discussed above.

Figure 10A:
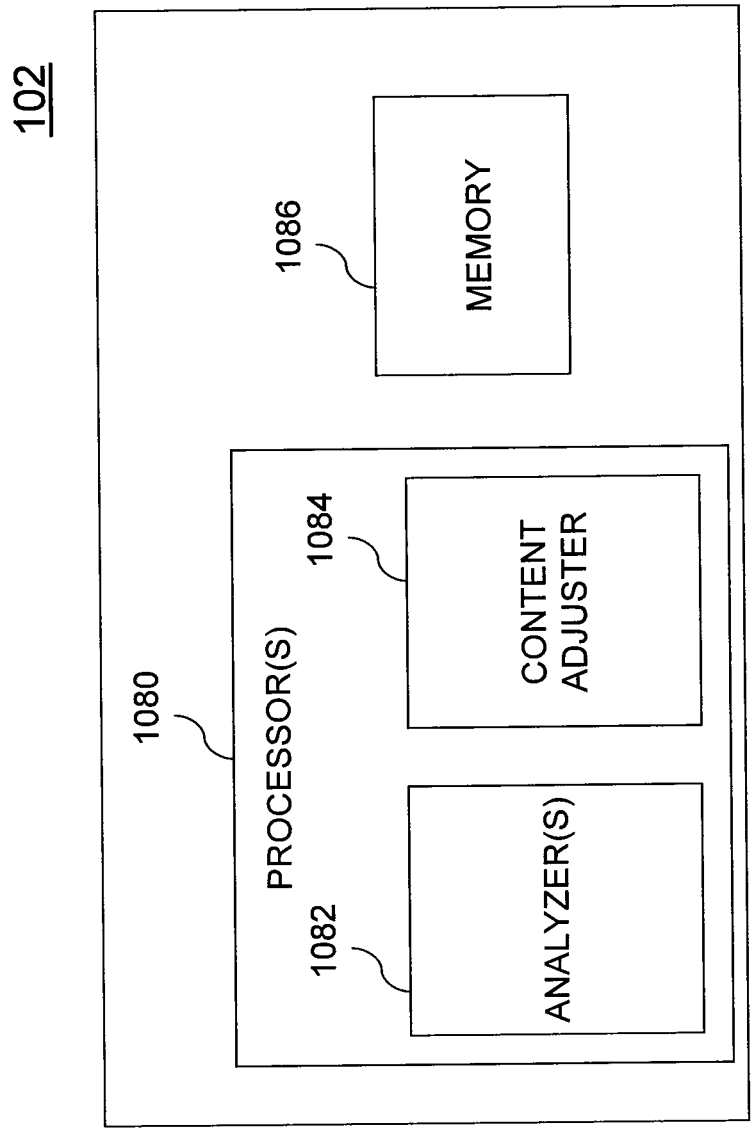
FIG. 10A illustrates one or more processors of a client device that includes a latency analyzer and a content adjuster, according to an embodiment of the present invention.

FIG. 10A depicts a client device 102 that includes one or more processors 1080, according to an embodiment. The processor(s) 1080 can include one or more analyzers 1082 that can obtain and analyze, at least in part, latency-related limitations and web content needs of client device 102 as discussed earlier in this document. The processor(s) 1080 can also include a content adjuster 1084 that can make adjustments, at least in part, to the web content to be provided and/or displayed at client device 102 based on the determinations made by latency analyzer 1082. In embodiments, client device 102 can also include a memory 1086 for assisting with the analysis by the analyzer(s) 1082 and/or the web content adjustments by the content adjuster 1084. In other embodiments (not shown), client device 102 can include one or more of the analyzers 1082, but not include content adjuster 1084, or vice versa (or any combination of analyzers and content adjuster)

Figure 10B:
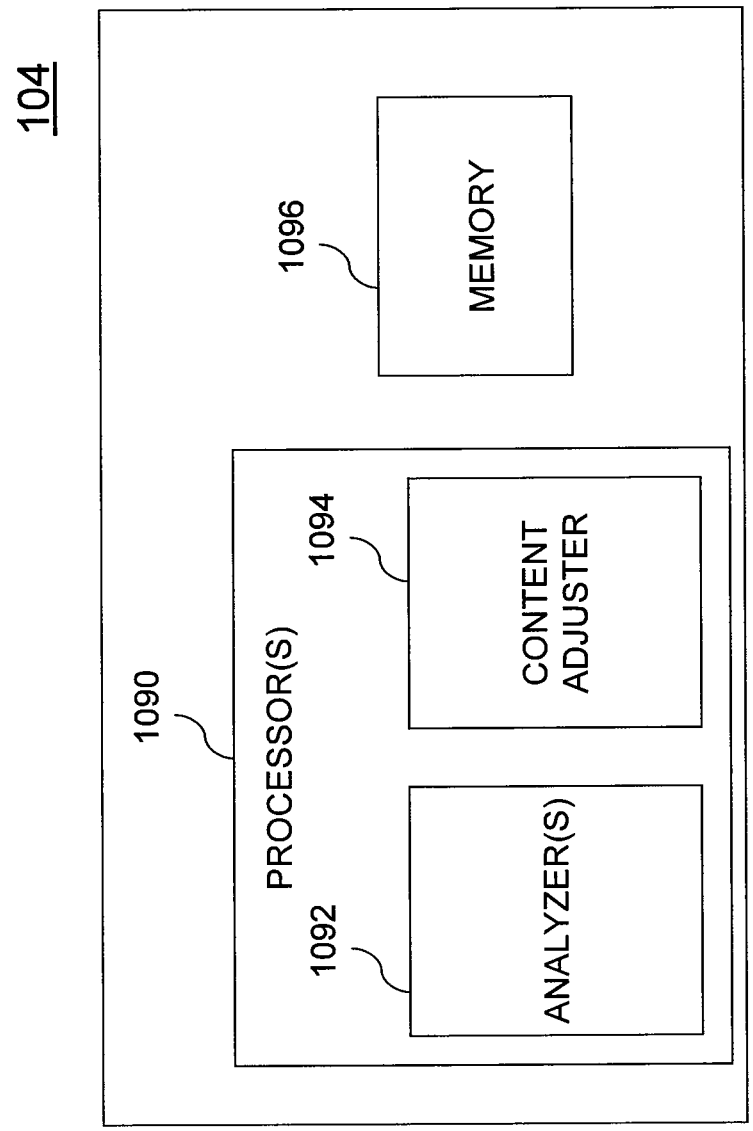
FIG. 10B illustrates one or more processors of a server device that includes a latency analyzer and a content adjuster, according to an embodiment of the present invention.

FIG. 10B depicts a web content server 104 that includes one or more processors 1090, according to an embodiment. The processor(s) 1090 can include one or more analyzers 1092 that can obtain and analyze, at least in part, latency-related limitations and web content needs of a client device 102 as discussed earlier in this document. The processor(s) 1090 can also include a content adjuster 1094 that can make adjustments, at least in part, to the web content to be provided and/or displayed at client device 102 based on the determinations made by latency analyzer 1092. In embodiments, web content server 104 can also include a memory 1096 for assisting with the analysis by the analyzer(s) 1092 and/or the web content adjustments by the content adjuster 1094. In other embodiments (not shown), web content server 104 can include one or more of the analyzers 1092, but not include content adjuster 1094, or vice versa (or any combination of analyzers and content adjuster).

Embodiments of the present invention can include a client device 102 as depicted and discussed above with reference to the embodiment shown in FIG. 10A, a web content server 104 as depicted and discussed above with reference to the embodiment shown in FIG. 10B, or both. In embodiments that include both, for example, the determination of latency-related limitations and web content needs of the client device 102 can be handled by either the processor(s) 1080 of the client device 102, the processor(s) 1090 of the web content server 104, or a combination of the processors of both client device 102 and web content server 104. Similarly, the adjustments to the web content that are made based on that determination can be handled by either the processor(s) 1080 of the client device 102, the processor(s) 1090 of the web content server 104, or a combination of the processors of both client device 102 and web content server 104.

Methods

Figure 11:
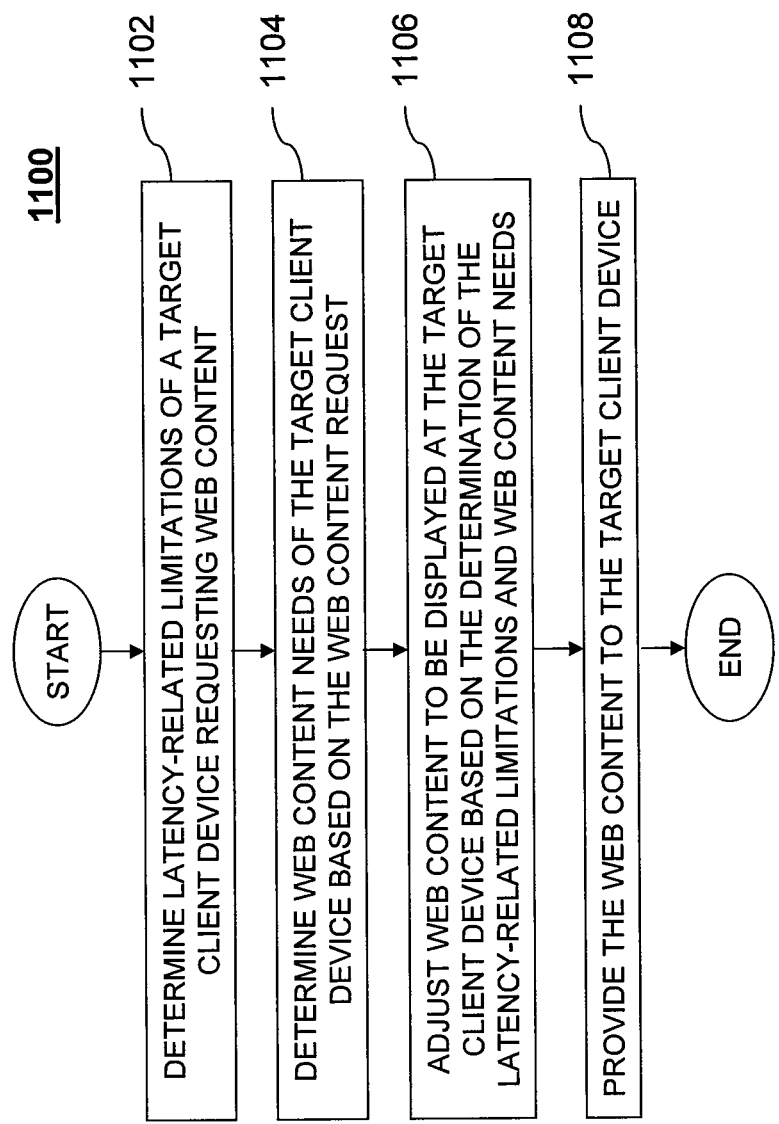
FIG. 11 is a flow chart depicting a method of providing web content from a server to a client over a network based on target latency, according to an embodiment of the present invention.

FIG. 11 is a flow chart depicting a method 1100 of adjusting web content provided from a server device to a client device over a network based on target latency, according to an embodiment of the present invention. In step 1102, latency-related limitations of a requesting target client device are determined. In embodiments, this determination can be done by the client device, the server device, or a combination of both. In embodiments, this determination can include determining a network latency and/or speed of the network including the client device, and/or a rendering latency of the client device, for example, as depicted in FIG. 12.

In an embodiment, determining a network latency and/or speed of the network can include measuring a round-trip time delay of a ping from the web content server to the target client device and/or a ping from the target client device to the web content server. In another embodiment, determining a network latency and/or speed of the network can include measuring a length of time it takes for a web content item to be requested by the target client device, fetched by the web content server, and delivered to the target client device for display. This measurement may also include displaying the web content on the client device. In other embodiments, determining a network latency and/or speed of the network can include analyzing statistics collected in user sessions of the target client device and/or collected based on an IP address of the client device. In further embodiments, determining a network latency and/or speed of the network can include analyzing characteristics of the target client device, a network connection type of the target client device, and/or an interne service provider of the target client device.

Referring back to FIG. 11, in step 1104, web content needs of the target client device based on a web content request from the target client device are determined. In embodiments, this determination can be done by the client device, the server device, or a combination of both. In embodiments, this determination can include determining a level of detail of the requested web content, parts of the web content that need to be provided to the client device, and/or an expected display area size of the web content to be displayed, for example, as depicted in FIG. 13.

In embodiments, determining parts of the web content that need to be provided to the client device can include determining portions of the web content that are not already cached at the target client device, determining portions of the web content that are in a requested view of the target client device, and/or determining portions of the web content that are considered more useful to a user of the target client device, for example, as depicted in FIG. 14. In an embodiment, determining portions of the web content that are in the requested view of the target client device can include, for example, determining image tiles of an image that are in the direction of user view.

Referring back to FIG. 11, in step 1106, web content to be displayed at the target client device is adjusted based on the determination(s) made in stepa 1102 and 1104. In embodiments, the adjusting can include adjusting the number of display items to be displayed at the target client device, adjusting a display area size for displaying one or more display items at the target client device, and/or adjusting a compression level for one or more display items to be displayed at the target client device, as depicted in FIG. 15. In an embodiment, adjusting the number of display items to be displayed can include, for example, adjusting the number of images to be displayed. In an embodiment, adjusting the display area size for displaying one or more display items can include, for example, adjusting the display area size of one or more images to be displayed. In an embodiment, adjusting a compression level for one or more display items to be displayed can include, for example, adjusting the compression level for one or more images to be displayed. In an embodiment, adjusting a compression level for one or more display items to be displayed can include, for example, adjusting the compression level to compress image tiles in an approximate center of an image at a lower compression level and to compress image tiles near a border of the image at a higher compression level. In embodiments of the present invention, at least a portion of the adjusting of web content to be displayed can be done at the server device, at the client device, or at a combination of the two devices.

Figure 16:
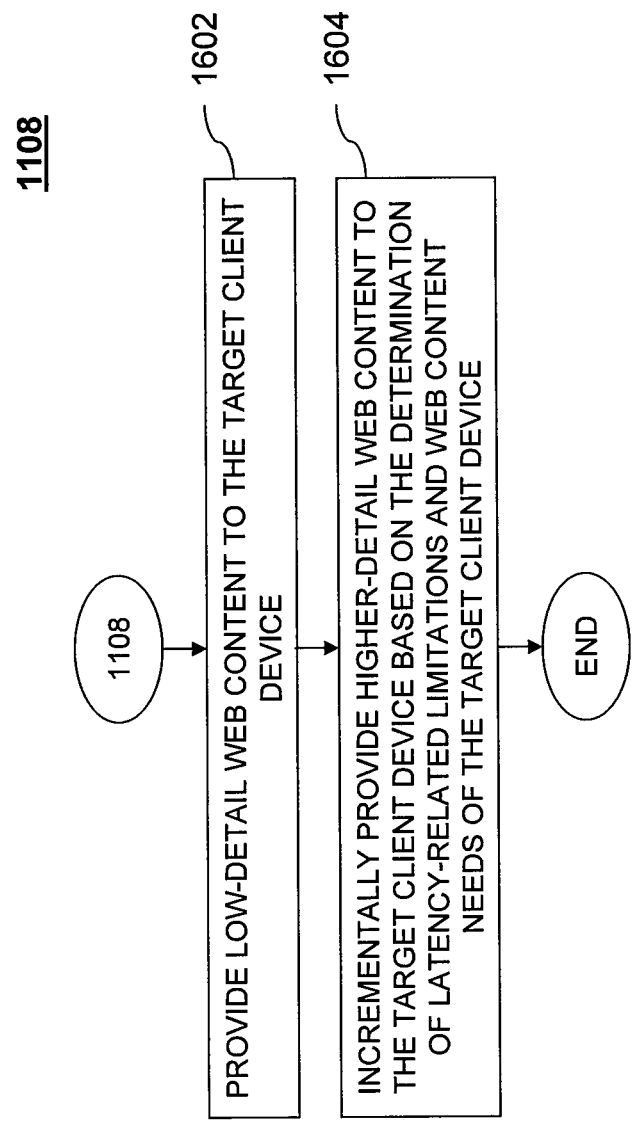
FIG. 16 depicts further detail of step 1108 of the method depicted in FIG. 11, according to an embodiment of the present invention.

Referring again to FIG. 11, in an embodiment that includes step 1108, the web content is provided to the target client device. In an embodiment, the web content may have been adjusted at least in part by the server device prior to being provided to the client device. In an embodiment, providing the web content to the target client device includes, for example, providing low-detail web content to the target client device, and incrementally providing higher-detail web content to the target client device based on the determination of latency-related limitations of the target client device, as depicted in FIG. 16. In one embodiment, the providing of low-detail and higher-detail web content can be done using an incremental encoding technique. In another embodiment, the providing of low-detail and higher-detail web content can be done using a wavelet encoding technique.

Exemplary Computer System

Figure 17:
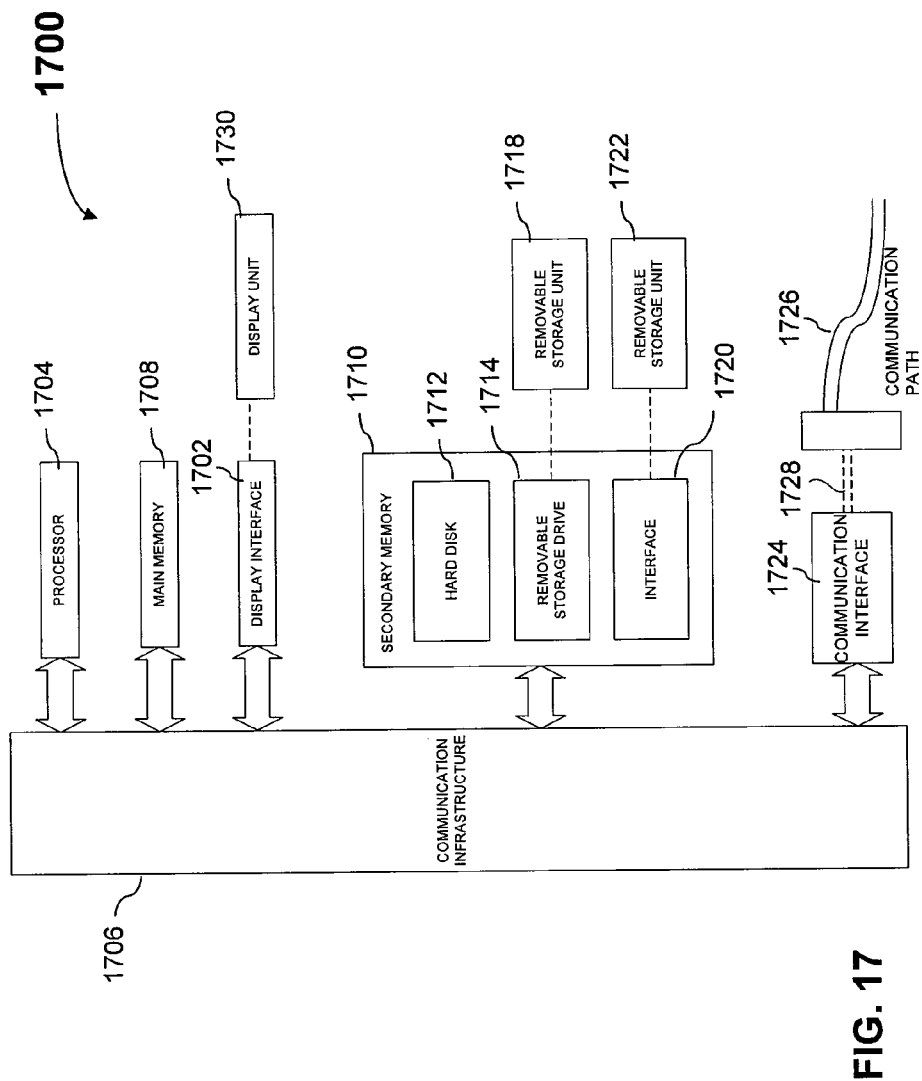
FIG. 17 is an exemplary block diagram of a computer system that can be used to implement embodiments of the present invention.

The various embodiments described herein may be implemented using hardware, software or a combination thereof and may be implemented in a computer system or other processing system. In an embodiment, the invention is directed toward a computer program product executing on a computer system capable of carrying out the functionality described herein. An example of a computer system 1700 is shown in FIG. 17. The computer-based systems for providing web content from a server to a target client described above could be implemented in one or more computer systems including, but not limited to, computer system 1700. The computer system 1700 includes one or more processors, such as processor 1704. Processor 1704 may be a general purpose processor (such as, a CPU) or a special purpose processor (such as, a GPU). Processor 1704 is connected to a communication infrastructure 1706 (e.g., a communications bus, cross-over bar, or network). Various software embodiments are described in terms of this example computer system. After reading this description, it will become apparent to a person skilled in the relevant art how to implement the invention using other computer systems and/or computer architectures.

Computer system 1700 (optionally) includes a display interface 1702 (which can include input/output devices such as keyboards, mice, etc.) that forwards graphics, text, and other data from communication infrastructure 1706 (or from a frame buffer not shown) for display on display unit 1730.

Computer system 1700 also includes a main memory 1708, preferably random access memory (RAM), and may also include a secondary memory 1710. The secondary memory 1710 may include, for example, a hard disk drive 1712 and/or a removable storage drive 1714, representing a floppy disk drive, a magnetic tape drive, an optical disk drive, etc. The removable storage drive 1714 reads from and/or writes to a removable storage unit 1718 in a well-known manner. Removable storage unit 1718, represents a floppy disk, magnetic tape, optical disk, memory card, etc. which is read by and written to by removable storage drive 1714. As will be appreciated, the removable storage unit 1718 includes a computer readable storage medium having stored therein computer software and/or data.

In alternative embodiments, secondary memory 1710 may include other similar means for allowing computer programs or other instructions to be loaded into computer system 1700. Such means may include, for example, a removable storage unit 1722 and an interface 1720. Examples of such may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a communication interface 1724. Communication interface 1724 enables computer 1700 to communicate with external and/or remote devices. For example, communication interface 1724 allows software and data to be transferred between computer system 1700 and external devices. Communication interface 1724 also allows computer 1700 to communicate over communication networks, such as LANs, WANs, the Internet, etc. Communication interface 1724 may interface with remote sites or networks via wired or wireless connections. Examples of communications interface 1724 may include a modem, a network interface (such as an Ethernet card), a communications port, a PCMCIA slot and card, etc. Computer 1700 receives data and/or computer program products via communication network 1724. Software and data transferred via communications interface 1724 are in the form of signals 1728 which may be electronic, electromagnetic, optical or other signals capable of being received by communications interface 1724. These signals 1728 are provided to communications interface 1724 via a communications path (i.e., channel) 1726. This channel 1726 carries signals 1728 and may be implemented using wire or cable, fiber optics, a phone line, a cellular phone link, an RF link and other wired or wireless communications channels.

In this document, the terms "computer program medium" and "computer usable medium" and "computer readable medium" are used to generally refer to media such as removable storage drive 1714, and a hard disk installed in hard disk drive 1712. These computer program products are means for providing software to computer system 1700.

Computer programs (also called computer control logic) are stored in main memory 1708 and/or secondary memory 1710. Computer programs may also be received via communications interface 1724. Such computer programs, when executed, enable the computer system 1700 to perform the features of the present invention as discussed herein. In particular, the computer programs, when executed, enable the processor 1704 to perform the features of the present invention. Accordingly, such computer programs represent controllers of the computer system 1700.

In an embodiment implemented using software, the software may be stored in a computer program product and loaded into computer system 1700 using removable storage drive 1714, hard disk drive 1712 or communications interface 1724. The control logic (software), when executed by the processor 1704, causes the processor 1704 to perform the functions of the invention as described herein.

Embodiments of the invention can work with software, hardware, and operating system implementations other than those described herein. Any software, hardware, and operating system implementations suitable for performing the functions described herein can be used.

CONCLUSION

Embodiments of the present invention relate to the retrieval, serving, and rendering of web content provided from a web content server to a requesting client device, e.g., over a network such as the Internet, based on target latency. Embodiments described above can be useful for various web-based or mobile device applications, and are therefore not to be limited to web browsing applications. Furthermore, embodiments of the present invention are not to be limited to HTML-related web applications, as other types of applications (Java, Flash, etc.) would also benefit from this invention.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The Summary and Abstract sections may set forth one or more but not all exemplary embodiments of the present invention as contemplated by the inventors, and thus, are not intended to limit the present invention and the appended claims in any way.

What is claimed is:

1. A computer-implemented method of adjusting web content provided from a server to a client over a network based on target latency, the method comprising:
   determining, by one or more of a processor of a web content server and a processor of a requesting target client device in communication with the web content server, latency-related limitations of the requesting target client device;
   determining, by one or more of the web content server and the target client device, web content needs of the target client device based on a web content request from the target client device related to a set of image tiles associated with geographical information and characteristics of the target client device prior to the web content request;
   receiving, by the target client device, the set of image tiles associated with geographical information based on the determination of the latency-related limitations of the requesting target client device and the determination of web content needs of the requesting target client device; and
   adjusting a resolution of each image tile within the set of image tiles to be displayed at the target client device based on the determination of the latency-related limitations and the web content needs of the target client device, wherein the adjusting based on the determination of the latency-related limitations and the web content needs of the target client device includes adjusting the resolution of a first image tile based on a position in relation to a second image tile within a view window of the target client device.

2. The method of claim 1, wherein at least a portion of the adjusting of web content occurs at the web content server.

3. The method of claim 1, wherein at least a portion of the adjusting of web content occurs at the target client device.

4. The method of claim 1, wherein the determining of the latency-related limitations comprises at least one of:
   determining a network latency or speed of a network including the target client device; and
   determining a rendering latency of the target client device.

5. The method of claim 4, wherein the determining the network latency or speed comprises measuring a round-trip time delay of one or more of a ping from the web content server to the target client device and a ping from the target client device to the web content server.

6. The method of claim 4, wherein the determining the network latency or speed comprises measuring a length of time it takes for a web content item to be requested by the target client device, fetched by the web content, server, and delivered to the target client device.

7. The method of claim 4, wherein the determining the network latency or speed comprises analyzing statistics collected in user sessions of the target client device.

8. The method of claim 4, wherein the determining the network latency or speed comprises analyzing statistics collected based on an IP address of the target client device.

9. The method of claim 4, wherein the determining the network latency or speed comprises analyzing characteristics of one or more of the target client device, a network connection type of the target client device, and an internet service provider of the target client device.

10. The method of claim 1, wherein the determining web content needs of the target client device comprises at least one of:
    determining a level of detail of the web content requested by the target client device;
    determining parts of the web content that need to be provided to the target client device; and
    determining an expected display area size of the web content to be displayed.

11. The method of claim 10, wherein the determining the parts of the web content that need to be provided to the target client device comprises at least one of:
    determining portions of the web content that are not already cached at the target client device;
    determining portions of the web content that are in a requested view of the target client device and
    determining portions of the web content that are more useful to a user of the target client device.

12. The method of claim 11, wherein the determining the portions of the web content that are in the requested view of the target client device comprises determining image tiles of an image that are in the direction of user view at the target client device.

13. The method of claim 1, wherein the adjusting based on the web content needs of the target client device further comprises one or more of:
    adjusting a number of display items to be displayed at the target client device;
    adjusting a display area size for displaying one or more display items at the target client device; and
    adjusting a compression level for one or more display items to be displayed at the target client device.

14. The method of claim 13, wherein the adjusting a number of display items comprises adjusting a number of images to be displayed.

15. The method of claim 13, wherein the adjusting the display area size for one or more display items comprises adjusting the display area size of one or more images to be displayed.

16. The method of claim 13, wherein the adjusting the compression level for one or more display items comprises adjusting the compression level for one or more images to be displayed.

17. The method of claim 16, wherein the adjusting the compression level for one or more images comprises adjusting the compression level to compress image tiles in an approximate center of an image at a lower compression level and to compress image tiles near a border of the image at a higher compression level.

18. The method of claim 1, further comprising:
providing the web content to the target client device.

19. The method of claim 18, wherein the providing the web content to the target client device comprises:
providing low-detail web content to the target client device; and
incrementally providing higher-detail web content to the target client device based on the determination of latency-related limitations and web content needs of the target client device.

20. The method of claim 19, wherein the providing low-detail web content and incrementally providing higher-detail web content comprise providing the web content using an incremental encoding technique.

21. The method of claim 20, wherein the providing low-detail web content and incrementally providing higher-detail web content comprise providing the web content using a wavelet encoding technique.

22. A computer-based system for receiving web content from a server based on target latency, the system comprising:
a client device including at least one processor and display capability, the client device in communication with a web content server; and
one or more analyzers embodied at least in part in the client device that, upon a request for web content from the client device to the web content server:
determines latency-related limitations of the client device and web content needs of the client device based on the web content request and characteristics of the target client device prior to the web content request, wherein the web content request is related to a set of image tiles associated with geographical information
receives the set of image tiles associated with geographical information based on the determination of the latency-related limitations of the requesting client device and the determination of web content needs of the client device, and adjusts a resolution of each tile within the set of image tiles to be displayed at the client device based on the latency-related limitations and the web content needs of the client device to optimize web content display response time at the client device, wherein the resolution of a first image tile is adjusted based on a position adjacent in relation to a second image tile within a view window of the client device.

23. The system of claim 22, wherein the client device is in communication with the web content server over a network.

24. The system of claim 23, wherein the network comprises the Internet.

25. The system of claim 22, further comprising:
a web content adjuster embodied at least in part in the client device that adjusts the web content to be displayed at the client device based on the latency-related limitations and web content needs.

26. The system of claim 22, wherein the latency-related limitations of the client device include at least one of:
a network latency or speed; and
a rendering latency of the client device.

27. The system of claim 22, wherein the web content needs of the client device include at least one of:
a level of detail of the web content requested by the client device;
parts of the web content that need to be provided to the target client device; and
an expected display area size of the web content to be displayed.

28. A web content server that provides web content to a requesting client device, the web content server comprising:
one or more processors that retrieve and serve web content to a requesting client device in communication with the web content server; and
one or more analyzers embodied at least in part in the one or more processors that, upon receiving a request for web content from the client device related to a set of image tiles associated with geographical information:
determines latency-related limitations of the client device and web content needs of the client device based on the web content request and characteristics of the target client device prior to the request for web content;
retrieves the set of image tiles associated with geographical information based on the determination of the latency-related limitations of the requesting client device and the determination of web content needs of the client device, and
adjusts a resolution of each image tile within the set of image tiles to be displayed at the client device based on the latency-related limitations and the web content needs of the client device to optimize web content display response time at the client device, wherein the resolution of a first image tile is adjusted based on a position in relation to a second image tile within a view window of the client device.

29. The web content server of claim 28, further comprising:
a web content adjuster embodied at least in part in the one or more processors that adjusts the web content to be displayed at the client device based on the latency-related limitations and web content needs.

30. A tangible computer program product comprising a computer readable device having computer program logic recorded thereon for causing at least one processor of one or more of a web content server and a client device requesting web content from the web content server to:
determine latency-related limitations of the client device;
determine web content needs of the client device based on a web content request from the client device related to a set of image tiles associated with geographical information and characteristics of the target client device prior to the web request;
receive the set of image tiles associated with geographical information based on the determination of the latency-related limitations of the client device and the determination of web content needs of the client device; and
adjust a resolution of each image tile within the set of image tiles to be displayed at the client device based on the latency-related limitations and the web content needs of the client device such that web content display response time at the client device is optimized, wherein the resolution of a first image tile is adjusted based on a position in relation to a second image tile within a view window of the client device.

\* \* \* \* \*

UNITED STATES PATENT AND TRADEMARK OFFICE
CERTIFICATE OF CORRECTION

PATENT NO.        : 8,706,802 B1                              Page 1 of 1
APPLICATION NO.   : 12/625352
DATED             : November 24, 2009
INVENTOR(S)       : Dayan et al.

It is certified that error appears in the above-identified patent and that said Letters Patent is hereby corrected as shown below:

In the Claims

Column 14, line 19, Claim 6, please remove --,-- after the word "content"

Column 16, line 51, Claim 30, after the word "web", please insert the word --content--

Signed and Sealed this
Eighteenth Day of November, 2014

Michelle K. Lee
*Deputy Director of the United States Patent and Trademark Office*